Patented Oct. 12, 1948

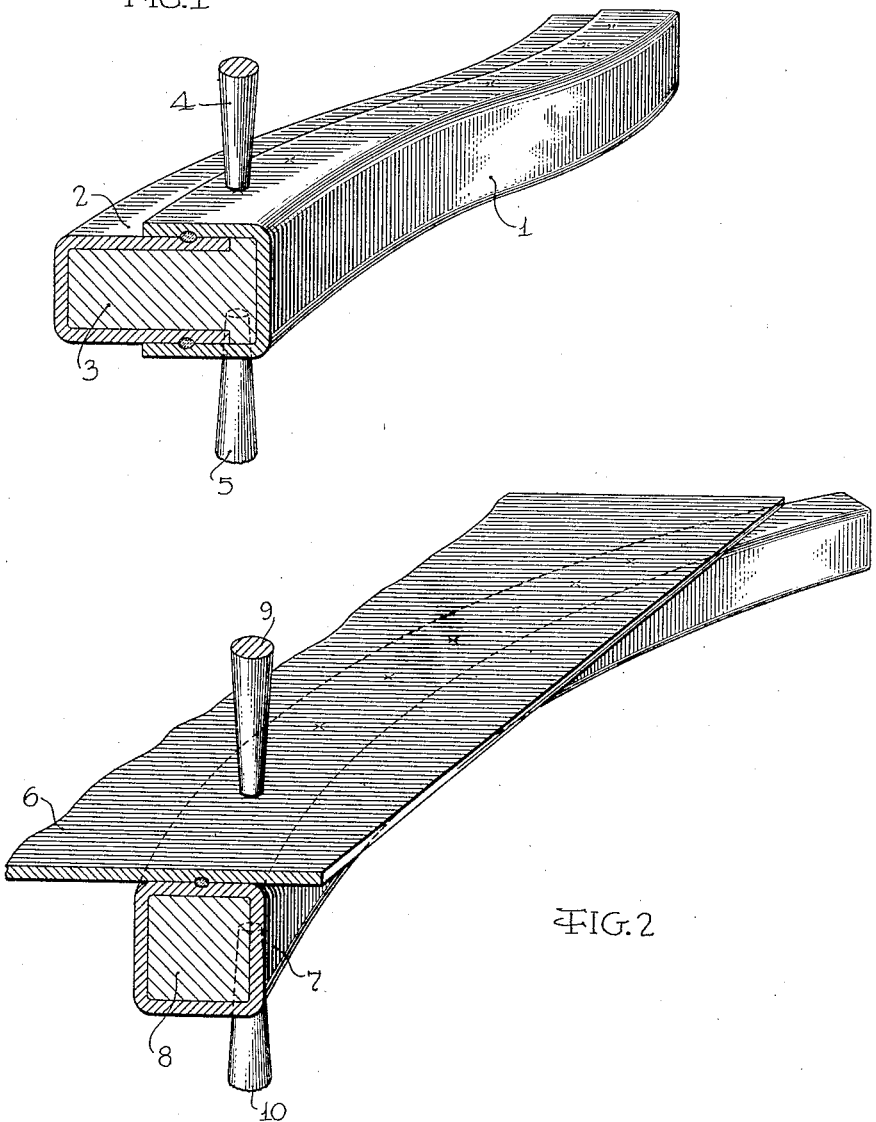

2,451,442

UNITED STATES PATENT OFFICE 2,451,442

METHOD OF SPOT WELDING HOLLOW SECTIONS

Clarence E. Meissner, Washington, D. C., assignor to The Budd Company, Philadelphia, Pa., a corporation of Pennsylvania Application March 21, 1946, Serial No. 656,077

1 Claim. (Cl. 219—10)

The invention relates to a method of spot or seam welding, and more particularly to the making of closed box-sectional structures and to the attachment of members to such structures. In addition to welding, the invention is applicable also to other procedures, such as for instance, riveting or screwing, in cases where a thin wall of a hollow structure has to be supported temporarily on the inside to take up the pressure exerted on its outside.

The main object of the invention is a method permitting electric spot welding, seam welding, or the like of closed hollow sections, such as thin-walled sheet metal box sections, and to overcome the difficulties encountered frequently with known methods as outlined hereinafter.

In welding thin-walled closed elongated sections, a copper mandrel is normally used in the interior of the section. The use of such mandrel has its limitations if the shape of the section is intricate and variable. Often a straight section has to be welded and then bent into the desired shape, because in the final shape the locations for the welds are not accessible at all, or connecting flanges have to be provided which are accessible from both sides.

Furthermore, with the known methods, it is sometimes impossible to spot-weld an additional member to a finished closed section or body because the walls of the section are not strong enough to sustain the welding pressure and the weld region is not accessible from the inside for positioning an electrode or a removable filler piece or mandrel. Therefore, it is often necessary to use less desirable connecting methods, such as fusion welding, screwing, special types of riveting, etc.

The invention, which overcomes the aforesaid difficulties, consists mainly in the steps: firstly, of filling the interior of the box section or hollow article with a molten alloy having a relatively low melting point and allowing the filler metal to harden, secondly, of performing the spot welding or the like operation with the usual high pressure and current, and thirdly, of heating the structure to the melting temperature of the filler alloy and letting the latter run out of interior of the article. During the welding or the like operation, the alloy performs the function of the hitherto used copper mandrel or the like above referred to but with better effect in that it fully fills all hollow portions no matter how irregular they may be. As an alloy with a relatively low melting point is to be understood an alloy which melts at a temperature low enough so as not to affect deleteriously or undesirably the material of the workpiece, that is, will not fuse its surface, alloy with it, draw its temper or the like; consequently, for different articles alloys of different melting points may be employed.

The invention is diagrammatically illustrated in the attached drawing, in which:

Figure 1 is a perspective sectional view of a closed box section in the process of manufacture; and Figure 2 is a similar perspective view of a closed hollow section to which a second member is being welded.

In the embodiment illustrated in Figure 1, two curved complementally shaped channels 1 and 2 are arranged so that their side walls overlap one another, whereupon the interior of the box section formed by the channels is filled with an alloy 3 of appropriately low melting temperature. After solidification of the alloy 3, the overlapping walls are connected with each other by welding current passed through electrodes 4 and 5 the pressure exerted by the electrodes being transmitted by the filler 3 which may also transmit a part of the welding current. Finally the structure is reheated to melt the alloy 3 and the alloy is poured out of the structure. Obviously, the alloy can be used over and over again.

In Figure 2, a member 6, such as a sheet metal plate, is brought into overlapping engagement with a closed box section 7 after the latter is filled with an alloy 8, and the members 6 and 7 are spotwelded together by means of the electrodes 9 and 10. In this case too, the filler alloy is removed after the completion of the connecting operation by reheating the structure.

As indicated above, the nature of the alloy used for filling the interior of the structure to be welded depends entirely on the nature of the structure itself. In some instances, a so-called low-melting-point alloy will be required, such as the well known Wood's metal. In other instances alloys having a higher melting point may be used advantageously. Also the nature of the article and its intended use determine whether the melting point of the filler alloy is above or below the temperature resulting in changes of the material of the article to be considered deleterious in the specific instance. For instance, annealing or discoloration of an article made according to the invention may be unobjectionable in some cases while in other cases such changes would be inadmissible. It is not necessary to give here the composition of any metal alloys suited for carrying out the invention because they are well known to those skilled in the art, their compositions can be found in any engineering or metallurgical handbook, and appropriate alloys can easily be selected in view of the necessary properties outlined herein.

The invention is applicable to a wide variety of materials and structures. As examples may be given stainless steel whose strength has been increased by cold working, aluminum and its alloys, and many other metals and materials in general which are not deleteriously affected by the heating incident to the filling with the alloy and the reheating for removing it.

The invention is applicable not only to completely closed sections or hollow articles but may advantageously be used for hollow structures and articles in general having portions inacessible to welding or other tools but adapted to be filled with an alloy after temporarily closing up the space in question.

The invention is not restricted to any specific embodiments, but protection is sought for the invention as broadly as expressed, in the light of the definitions given hereinbefore, by the attached claim.

What is claimed is:

The method of effecting electrical resistance welding upon metallic workpieces having hollow portions which are subject to deforming electrode pressure and which hollow portions are irregular in shape, which comprises, entirely filling the hollow portions which are to come between the electrodes during welding with molten metal of a very low melting temperature point as compared to the melting point of the workpiece, whereby injury to the workpiece by surface melting is avoided, allowing the filler metal to harden, the filler metal being of such character that it is not appreciably plastic under electrode pressure, applying electrode pressure and current through the hollow portions and the filler metal therein to make the welds, the filler metal being of such character and mass that it transmits welding current efficiently without softening or melting whereby to maintain efficient current flow directly therethrough without permitting deformation of the workpiece, and finally removing the filler metal from the workpiece by melting it and causing it to flow out of the hollow portions.

CLARENCE E. MEISSNER.

REFERENCES CITED

The following references are of record in the file of this patent:

UNITED STATES PATENTS

| Number | Name | Date |
| --- | --- | --- |
| 1,041,176 | Schitzkowsky | Oct. 15, 1912 |
| 1,258,854 | Barthelmes | Mar. 12, 1918 |
| 1,280,892 | Steenstrup | Oct. 8, 1918 |
| 1,560,201 | Bingham | Nov. 3, 1925 |
| 1,995,368 | Sunnen | Mar. 26, 1935 |
| 2,057,017 | De Ganahl | Oct. 13, 1936 |
| 2,079,857 | Holan | May 11, 1937 |
| 2,324,435 | Smith | July 13, 1943 |

OTHER REFERENCES

Cerrosafe, Cerro De Pasco Copper Corporation, 40 Wall Street, New York 5, N. Y. January 1944.